United States Patent
Little

[11] 4,000,459
[45] Dec. 28, 1976

[54] LINEAR ECL DISTANCE MEASURING GAUGE
[75] Inventor: William R. Little, Seattle, Wash.
[73] Assignee: Eldec Corporation, Lynnwood, Wash.
[22] Filed: Oct. 24, 1974
[21] Appl. No.: 517,582
[52] U.S. Cl. .............................. 324/40; 324/34 PS; 331/183
[51] Int. Cl.² ........................................ G01R 33/12
[58] Field of Search .............. 324/40, 34 D, 34 PS, 324/41; 331/183

[56] References Cited
UNITED STATES PATENTS
3,883,796   5/1975   Holt et al. .................... 324/34 PS

*Primary Examiner*—Robert Segal
*Assistant Examiner*—Ernest F. Karlsen
*Attorney, Agent, or Firm*—Christensen, O'Connor, Garrison & Havelka

[57] ABSTRACT

A linear eddy current loss (ECL) proximity distance measuring gauge comprising an ECL oscillator and a linearizing DC feedback circuit is disclosed. As the distance between a magnetic target and the ECL coil increases and changes the impedance of the ECL tuned circuit, the linearizing DC feedback circuit shunts current away from the tuned circuit and controls the rate at which oscillation amplitude varies with a change in target distance. The amplitude control created by the linearizing DC feedback circuit results in oscillation amplitude being linearly related to the distance between the target and the ECL coil. A peak detector circuit detects oscillation amplitude and applies a directly related DC voltage to a buffering emitter follower output circuit. Thus, output voltage is linearly related to target distance.

16 Claims, 1 Drawing Figure

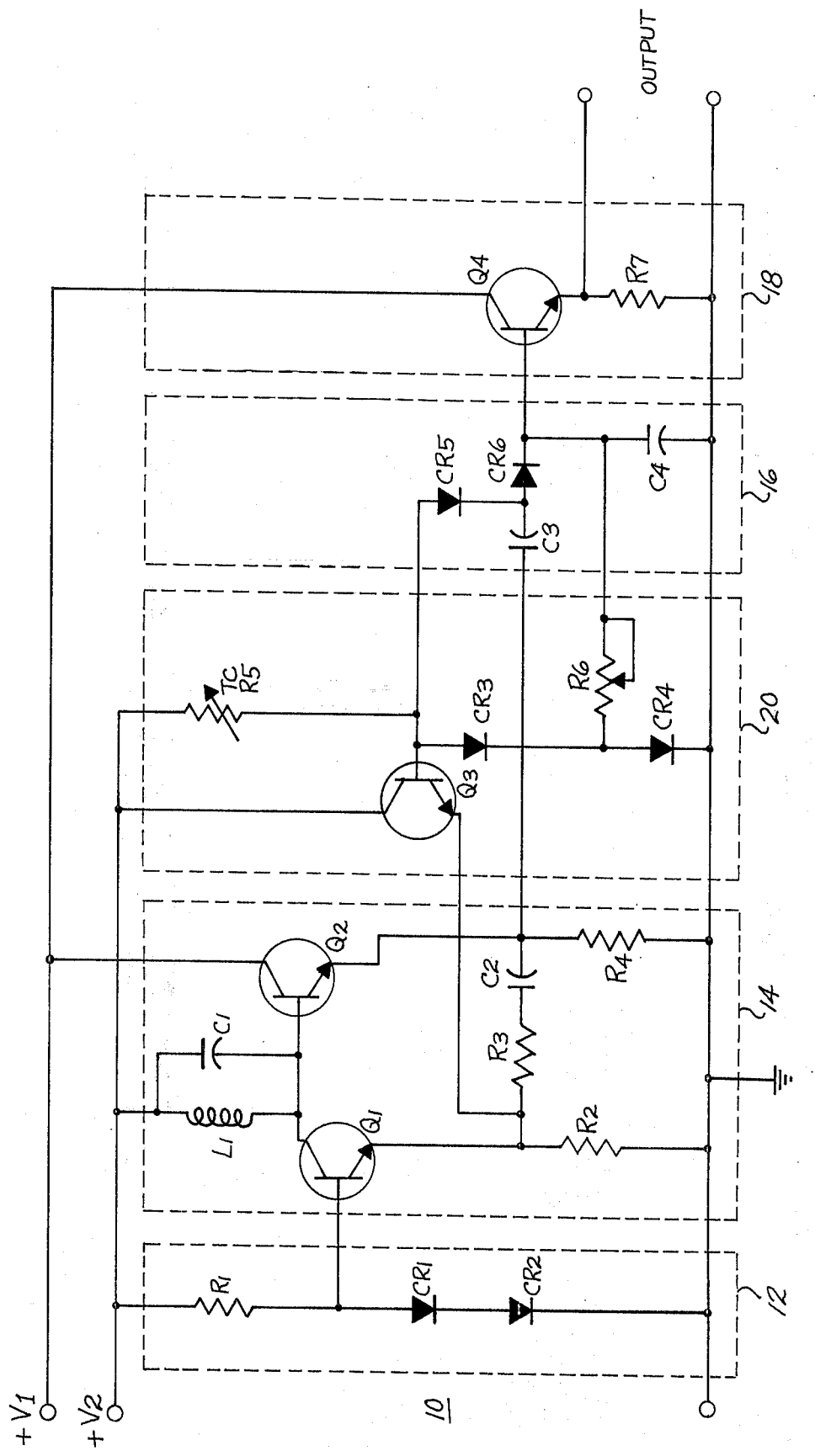

LINEAR ECL DISTANCE MEASURING GAUGE

BACKGROUND OF THE INVENTION

This invention is directed to electronic distance measuring or gauging and, more particularly, to eddy current loss proximity distance measuring gauges.

Eddy current loss (ECL) sensors are well known and widely used to sense whether or not a mental object (usually called a target) is within a predetermined distance of the coil of the tuned circuit of the ECL sensor. Such devices are used on aircraft, for example, to determine whether the doors of the aircraft are closed or open. Functionally, an ECL sensor comprises a high Q coil that forms part of a tuned (tank) circuit. The coil generates a magnetic field and forms the inductor portion of an oscillator circuit. The oscillator circuit includes just sufficient positive feedback to sustain oscillation in the absence of a metal target being in the proximity of the coil. When such a target is brought into the magnetic field generated by the coil, eddy currents are produced due to the target's conductivity. These eddy currents absorb energy from the magnetic field and, thereby, increase the losses of the ECL oscillator's tuned circuit. When the Q of the coil decreases below a certain determinable value, oscillation terminates. The change of distance between the coil and the target from maximum oscillation to termination of oscillation is very small. Because this distance is very small, it is difficult to use an ECL sensor directly to provide a measuring device. Moreover, the amplitude of oscillation over the small separation distance is nonlinear.

The prior art has proposed modifying ECL sensors in a manner such that they can be better utilized as distance measuring devices. Examples of such proposals are described in U.S. Pat. No. 3,609,580, issued to Francis T. Thompson et al on Sept. 28, 1971 for "Electrical Sensing Apparatus"; U.S. Pat. No. 3,619,805, issued to Stephen F. Bean on Nov. 9, 1971 for "Noncontacting Displacement Transducer Including an Oscillator with Cable-Connected Inductive Probe"; and, U.S. Pat. No. 3,747,011 issued to Robert Buck on July 17, 1973 for "Metal Detector Including Proximity-Responsive Oscillator with Feedback-Stabilized Gain". For various reasons, the devices proposed by these patents have not been as successful as desired. For example, the Thompson patent merely describes a circuit wherein the normal oscillation frequencies are shifted to a lower level, it does not provide a circuit which expands the target/coil separation distance in a linear manner and, thereby, provides operation over a greater range. While the Buck patent does disclose a technique for expanding the target/coil separation distance, it does so in a nonlinear manner. Thus, the output of the circuit proposed by Buck is nonlinearly related to a particular distance between the target and the coil. The Bean patent merely discloses a system wherein the frequency of operation is reduced in order to allow the overall system to be utilized in combination with a probe spaced from the electronic system by a greater distance than that allowed by prior art devices.

Thus, in general, the prior art proposals for utilizing ECL sensors as distance measuring devices either do not extend the target/coil separation distance over which measurements can be made, or they do so in a nonlinear manner. In addition, to these disadvantages, the prior art devices in general are not as temperature stable as desirable. Obviously, temperature stability is very important when a highly linear output is desired.

Therefore, it is an object of this invention to provide a new and improved ECL proximity distance measuring gauge.

It is a further object of this invention to provide an ECL proximity distance measuring gauge having an output that is linearly related to the distance being measured.

It is a still further object of this invention to provide a new and improved linear ECL proximity distance measuring gauge that is automatically temperature stabilized.

SUMMARY OF THE INVENTION

In accordance with principles of this invention, a linear eddy current loss (ECL) proximity distance measuring gauge is provided. The distance measuring gauge of the invention comprises an ECL oscillator and a linearizing DC feedback circuit. The linearizing DC feedback circuit is connected to shunt current flow away from the tuned circuit of the ECL oscillator. As the distance between the target and the ECL inductor varies and changes the impedance of the ECL oscillator's tuned circuit, the linearizing DC feedback circuit varies current flow through the oscillator's tuned circuit in a manner such that oscillation amplitude is linearly related to the distance between the target and the coil of the tuned circuit.

In accordance with other principles of this invention, a peak detector detects oscillation amplitude and applies a directly related DC voltage to a buffering emitter follower output circuit.

In accordance with other principles of this invention, the linearizing DC feedback circuit includes a transistor connected to shunt a portion of the ECL oscillator feedback current around the tuned circuit. The shunting transistor is controlled by the voltage developed due to current flowing through a diode, which current is varied in accordance with the output voltage of the peak detector. Since the diode control voltage is logarithmic, the shunting transistor is controlled in a manner such that a linear distance/oscillation amplitude relationship is established.

In accordance with still further principles of this invention, the ECL oscillator circuit includes a unity gain voltage amplifier as the main oscillation element and a unity gain current amplifier connected in the feedback path. The unity gain current amplifier is controlled by a biasing source. Temperature stability is provided by matching the bias source connected to the shunting transistor to the bias source connected to the unity gain current amplifier, or providing compensation to achieve a circuit match.

It will be appreciated from the foregoing brief summary that the invention provides a new and improved eddy current loss proximity distance measuring gauge. Shunting the feedback current in the recited manner expands the distance over which measurements can be made. In addition, the manner of shunting results in an output that is linearly related to the actual distance between a target and the coil of the ECL oscillator's tuned circuit. Further, a suitable matching of biasing components results in automatic temperature stability. Thus, the invention has three main advantages over prior art devices.

BRIEF DESCRIPTION OF THE DRAWING

The foregoing objects and many of the attendant advantages of this invention will become more readily appreciated as the same becomes better understood by reference to the following detailed description when taken in conjunction with the single figure which schematically illustrates a preferred embodiment of the invention.

DESCRIPTION OF THE PREFERRED EMBODIMENT

The single FIGURE illustrates a preferred embodiment of an eddy current loss proximity distance measuring gauge formed in accordance with the invention and comprises: a source of DC power 10; an oscillator bias supply 12; an eddy current loss (ECL) oscillator 14; a peak detector 16; an output driver circuit 18; and, a linearizing DC feedback circuit 20.

The DC power source 10 may be any convenient source of moderately regulated DC voltage. As illustrated, the DC power source 10 supplies positive voltage at two different levels, designated +V1 and +V2. The invention prefers that +V1 be twice the voltage of +V2 so that the oscillation amplitude of the hereinafter described ECL oscillator 14 is not limited by collector saturation of the oscillation transistor. In this regard, for the specific circuit component values set forth below, +V1 may equal +10VCD and +V2 may equal +5VDC. However, voltage levels other than these values can be used as long as the voltage levels chosen are compatible with the other elements of the overall circuit.

The oscillator bias supply 12 comprises: a resistor designates R1; and two diodes designated CR1 and CR2. R1 is connected between +V2 and the anode of CR1. The cathode of CR1 is connected to the anode of CR2 and the cathode of CR2 is connected to ground (the common terminal of the DC power source 10). The function of the oscillator bias supply 12 is to set the bias level for a linear current amplifier connected in the feedback path of the ECL oscillator 14 and, hence, control its amplification potential. The oscillator bias supply 12 also functions in conjunction with the feedback circuit 20 in the manner hereinafter described to provide temperature stability.

The ECL oscillator 14 comprises: first and second NPN transistors designated Q1 and Q2; first and second capacitors designated C1 and C2; an inductor designated L1; and, three resistors designated R2, R3, and R4. L1 and C1 are connected in parallel between +V2 and the base of Q2. The collector of Q2 is connected to +V1. The emitter of Q2 is connected through R4 to ground. The emitter of Q2 is also connectd through series connected C2 and R3 to the emitter of Q1. The emitter of Q1 is also connected through R2 to ground. The collector of Q1 is connected to the base of Q2 and the base of Q1 is connected to the junction between R1 and CR1.

L1 and C1 form the tuned circuit of the ECL oscillator. L1 is a high Q sensor coil which generates the magnetic field into which target is brought for measurement purposes. As is well known in the art, eddy currents produced due to the conductivity of the target absorb energy from the magnetic field. This energy absorption increases the loss of the ECL oscillator's tuned circuit and changes the Q of the inductor.

Q2 is a unity gain voltage amplifier transistor and is the main oscillation element. R3 provides an AC voltage to current conversion function. C2 blocks DC current from flowing through R3 and provides a convenience of circuit function. Q1 is a unity gain current amplifier transistor connected in the feedback path. Resistors R2 and R4 set the operating levels of Q1 and Q2, respectively, also as a convenience of circuit function. In other words, means other than C2, R2 and R4 could be utilized to provide the designated circuit functions.

In operation, the L1/C1 tuned circuit has a certain impedance at its resonant frequency. This impedance is such that a positive feedback current passes through the C2, R3 and Q1 feedback path to the tuned circuit. This positive feedback current initiates and sustains circuit oscillation. As will be understood by those skilled in the ECL sensor art, it is necessary that the impedance of the tuned circuit be greater than the effective impedance of the positive feedback path in order for oscillation to occur. As briefly discussed above, the impedance of the tuned circuit is decreased by the introduction of an eddy current loss term into the mathematical description of the ECL oscillator circuit. This term enters the description when a suitable target is brought near L1, or L1 is brought near such a target. In other words, the impedance of the tuned circuit is related to the distance between L1 and a metal piece herein called the target whose position it is desired to establish. The invention utilizes this target distance to tuned circuit impedance relationship, and the relationship between tuned circuit impedance and the effective impedance of the positive feedback path (mainly R3), to provide a novel distance measuring device. As will be better understood from the following description, the invention achieves its desired result by controlling the effective value of the feedback resistance R3.

The peak detector 16 comprises: two diodes designated CR5 and CR6; and, two capacitors designated C3 and C4. C3 is connected between the emitter of Q2 and the anode of CR6. The cathode of CR6 is connected though C4 to ground. The cathode of CR5 is connected to the junction between C3 and CR6. In essence, CR6 and C4 form the main elements of the peak detector. C3 and CR5 block the DC level present at the emitter of Q2, establish a desirable quiescent DC level for C4 when no oscillations exist and double the detected voltage to that of the peak-to-peak value of the oscillation waveform. The output of this circuit, taken across C4, is thus a DC voltage having a level related to the oscillation amplitude of the ECL oscillator, which oscillation amplitude forms the input to the peak detector.

The output driver circuit 18 comprises: an NPN transistor designated Q4; and, a resistor designated R7. The base of Q4 is connected to the junction between CR6 and C4. The collector of Q4 is connected to +V1 and the emitter of Q4 is connected through R7 to ground. A pair of output terminals are connected across R7. Q4 is an emitter follower transistor and R7 establishes its operating current level. The purpose of the output driver circuit 18 is to buffer the output of the peak detector 16 to prevent loading by downstream elements, i.e., elements connected across the output terminals such as an indicator, amplifier, etc. Buffering is necessary to prevent the load from drawing excessive current from C4 and, thus, creating excessive ripple in the DC output voltage.

The linearizing DC feedback circuit 20, which forms the heart of the present invention, comprises: an NPN transistor designated Q3; two diodes designated CR3 and CR4; a temperature compensation resistor designated TCR5; and, a potentiometer designated R6. The collector of Q3 is connected to +V2 and the emitter of Q3 is connected to the emitter of Q1. The base of Q3 is connected to the anodes of CR3 and CR5. The cathode of CR3 is connected to the anode of CR4 and the cathode of CR4 is connected to ground. TCR5 is connected between the base of Q3 and +V2. R6 is connected between the junction between CR3 and CR4 and the junction between CR6 and C4.

TCR5, CR3 and CR4 form a bias supply for Q3. It will be appreciated that, in essence, TCR5, CR3 and CR4 form a series circuit connected in parallel with the oscillator bias supply 12 formed by R1, CR1 and CR2. R6 forms a feedback control that varies the current through CR4 and, hence, varies Q3's base bias voltage. It is pointed out here and will be better appreciated from the following description of the operation of the linearizing DC feedback circuit 20 that the voltage across CR4 varies in a logarithmic manner with the current through CR4. The logarithmic voltage control results in the creation of a linear relationship between the output voltage across the output terminals and the distance between the target and L1. Thus, it is the linearizing DC feedback circuit 20 that allows a more or less conventional proximity sensing circuit of the type described above to be utilized as a distance measuring gauge having a linear output.

In operation, the linearizing DC feedback circuit 20 shunts positive oscillator feedback current passing through R3 away from the L1/C1 tuned circuit according to the DC voltage level across C4, as realized by the value of the feedback control resistor R6. A change in the value of the voltage across C4 creates a change in the current flow through CR4. This change varies the bias on the base of Q3 and, thus the value of the shunted current. The end result is that a change in voltage across C4 creates a change in the gauge factor which is to say a change in the rate at which amplitude oscillation varies with a change in target distance. Thus, the distance over which measurements can be made is expanded. Moreover, the expansion is linear.

Another way of describing the action of the linearizing DC feedback circuit 20 is to say that it controls, in essence, the effective value of R3 in a manner such that the output voltage is a measure of target distance. The rate at which the output voltage changes with target distance, i.e., the slope of the interrelationship curve is determined by the value of R6.

As briefly noted above the oscillator bias supply 12 coacts with the bias supply of the linearizing DC feedback circuit 20 formed by TCR5, CR3 and CR4 to provide temperature stabilization. In this regard, if CR1 and CR2 are chosen such that their characteristics match the characteristics of CR3 and CR4, and if Q1 and Q3 are matched for VBE and HFE, then the embodiment of the invention illustrated in the figure can readily be configured in a manner such that the output voltage will be independent of temperature. This result is readily obtained by matching TCR5 to R1. TCR5 then performs a temperature compensating function. Thus, it will be appreciated that not only is the output voltage of the present invention linear with respect to target distance, it is also very stable over extended periods of time, regardless of temperature variations.

As an alternate to matching CR1 and CR2 to CR3 and CR4, and TCR5 to R1, the same result can be achieved by choosing or adjusting TCR5 such that it compensates for R1 and any mismatch that exists between the chosen CR1 and CR2, and CR3 and CR4.

While the values of the various components of the circuit illustrated in the FIGURE can vary over a wide range, one set of resistor and capacitor values that allow the circuit to operate in the illustrated and described manner are set forth in the following table.

TABLE

| | |
|---|---|
| R1 | 39,000 ohms |
| R2 | 3,300 ohms |
| R3 | 5,000 ohms |
| R4 | 4,700 ohms |
| R5 | 39,000 ohms |
| R6 | 40,000 ohms |
| R7 | 10,000 ohms |
| C2 | .039 microfarads |
| C3 | .039 microfarads |
| C4 | .039 microfarads |

CR1–CR6 are standard diodes, CR1 and CR2 and CR3 and CR4 being preferably matched pairs of diodes for the reasons noted above. Q1–Q4 are standard amplifying transistors having the general characteristics discussed above. L1 and C1 are chosen so that the ECL oscillator has the desired resonant frequency. With respect to L1 and C1, it should be noted that the foregoing values of R3 and R6 were selected according to the characteristics created by a related L1/C1 tuned circuit. It should also be noted that the number of diodes forming the two bias supplies discussed above may be provided by some number of diodes other than two.

It will be appreciated from the foregoing discussion that the invention provides an eddy current loss proximity distance measuring gauge having an output that varies linearly over the distance measuring range. The output is very stable with changes in ambient temperature and passage of time. However, obvious refinements can be made to the illustrated circuit in order to improve the temperature compensation, increase the range over which the output voltage is linear and thereby improve its utility for a specific application.

It will be appreciated that the heart of this invention is the inclusion of a linearizing DC feedback circuit that controls the effective value of oscillator feedback current. This circuit and a novel means of utilizing it in an ECL oscillator results in the provision of a gauge having a greater degree of linearity and stability than has been realized by prior art devices directed to achieving the same end result.

While a preferred embodiment of the invention has been illustrated and described, it will be appreciated by those skilled in the art and others that various changes can be made therein without departing from the spirit and scope of the invention. Some of these changes have been briefly discussed above. However, other obvious changes also can be made, as necessary. For example, PNP transistors can be used and voltage polarity reversed, if desired. Moreover, components having values other than those specifically listed in the foregoing table can be utilized, as desired. Hence, the invention can be practiced otherwise than as specifically described herein.

The embodiments of the invention in which an exclusive property or privilege is claimed are defined as follows:

1. In an eddy current loss proximity distance measuring gauge comprising an eddy current loss oscillator including a feedback voltage controlling tuned circuit including a coil whose Q is varied when a magnetic target is brought into the magnetic field generated by said coil, said Q variation creating a change in the amplitude of the oscillations produced by said eddy current loss oscillator, the improvement comprising a linearizing circuit connected to said eddy current loss oscillator so as to sense the amplitude of the oscillations created by said eddy current loss oscillator and control, in a linear manner, the relationship between the amplitude of said oscillations and the distance between said coil and said metallic target.

2. An improved eddy current loss proximity distance measuring gauge as claimed in claim 1 wherein said linearizing circuit includes a linearizing DC feedback circuit that controls said linear relationship between the amplitude of said oscillations and the distance between said coil and said metallic target by shunting oscillator feedback current away from said feedback voltage controlling tuned circuit.

3. An improved eddy current loss proximity distance measuring gauge as claimed in claim 2 wherein said linearizing circuit also includes a peak detector circuit connected to said eddy current loss oscillator to detect the amplitude of the oscillations of said eddy current loss oscillator and, in accordance therewith, provide a control signal to said linearizing DC feedback circuit.

4. A linear eddy current loss proximity distance measuring gauge comprising:
   A. an eddy current loss oscillator including:
      1. an electronic amplification means;
      2. a feedback circuit connected to feed back a portion of the output of said electronic amplification means to the input thereof in a manner such that a feedback oscillator is formed by said electronic amplification means and said feedback circuit, said feedback circuit including a tuned circuit including a coil forming an eddy current loss proximity sensor element, said tuned circuit connected in a manner such that it controls the voltage fed back to the input of said electronic amplification means and, thus, the amplitude of the oscillations generated by said feedback oscillator; and,
   B. a linearizing circuit including:
      1. a detector for detecting the amplitude of the oscillations of said eddy current loss oscillator; and,
      2. a linearizing DC feedback circuit connected to said feedback oscillator and to said detector so as to shunt a portion of said current flow in said feedback circuit away from said tuned circuit in accordance with the amplitude of the oscillations detected by said detector.

5. A linear eddy current loss proximity distance measuring gauge as claimed in claim 4 wherein said electronic amplification means includes a first transistor and wherein said feedback circuit includes a second transistor, said tuned circuit being connected to the base of said first transistor.

6. A linear eddy current loss proximity distance measuring gauge as claimed in claim 5 wherein the emitter-collector terminals of said second transistor and said tuned circuit define a series circuit and wherein said linearizing DC feedback circuit includes a third transistor having its emitter-collector terminals connected in parallel with the series circuit defined by the emitter-collector terminals of said second transistor and said tuned circuit.

7. A linear eddy current loss proximity distance measuring gauge as claimed in claim 6 wherein said detector comprises a peak detector connected so as to sense the amplitude of the oscillations of feedback oscillator and create a DC voltage output linearly related thereto.

8. A linear eddy current loss proximity distance measuring gauge as claimed in claim 7 wherein said linearizing DC feedback circuit includes at least one diode connected between the base of said third transistor and ground and a resistor connected between said peak detector and the ungrounded end of said diode, said diode converting the DC voltage created by said peak detector into a logarithmic voltage change that controls the bias voltage applied to the base of said third transistor.

9. A linear eddy current loss proximity distance measuring gauge as claimed in claim 8 including a first biasing source connected to said second transistor and a second biasing source connected to said third transistor, said first and second biasing sources being matched.

10. A linear eddy current loss proximity distance measuring gauge as claimed in claim 9 wherein said first biasing source comprises a resistor connected in series with at least one diode across a suitable source of voltage, the junction between said resistor and said at least one diode connected to the base of said second transistor and wherein said second biasing source comprises a resistor connected in series with the diode forming a portion of said linearizing DC feedback circuit across a suitable source of voltage.

11. A linear eddy current loss proximity distance measuring gauge as claimed in claim 10 including a buffering emitter follower output circuit connected to receive the DC voltage output of said peak detector.

12. A linear eddy current loss proximity distance measuring gauge as claimed in claim 4 wherein said detector comprises a peak detector connected so as to sense the amplitude of the oscillations of said feedback oscillator and create a DC voltage output linearly related thereto.

13. A linear eddy current loss proximity distance measuring gauge as claimed in claim 12 wherein said linearizing DC feedback circuit includes at least one diode and a resistor connected between said peak detector and said diode in a manner such that said diode converts the DC voltage created by said peak detector into a logarithmic voltage change that controls the amount of current shunted by said linearizing DC feedback circuit.

14. A linear eddy current loss proximity distance measuring gauge as claimed in claim 12 including a buffering emitter follower output circuit connected to receive the DC voltage output of said peak detector.

15. A linear eddy current loss proximity distance measuring gauge as claimed in claim 4 including a first biasing source connected to said eddy current loss oscillator and a second biasing source connected to said linearizing DC feedback circuit, said first and second biasing sources being matched.

16. A linear eddy current loss proximity distance measuring gauge as claimed in claim 4 wherein said linearizing DC feedback circuit includes at least one diode and a resistor connected between said detector and said diode in a manner such that said diode converts the output created by said detector into a logarithmic voltage change that controls the amount of current shunted by said linearizing DC feedback circuit.

* * * * *